United States Patent
Chetlur et al.

(10) Patent No.: US 12,333,253 B2
(45) Date of Patent: Jun. 17, 2025

(54) AUTOMATIC DATA DOMAIN IDENTIFICATION

(71) Applicant: International Business Machines Corporation, Armonk, NY (US)

(72) Inventors: Malolan Chetlur, Jakkur (IN); Arvind Agarwal, New Delhi (IN); Subhendu Dey, Kolkata (IN); Sameep Mehta, Bangalore (IN); Sandipan Sarkar, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 17/529,899

(22) Filed: Nov. 18, 2021

(65) Prior Publication Data

US 2023/0153537 A1    May 18, 2023

(51) Int. Cl.
*G06F 40/30* (2020.01)
*G06F 9/445* (2018.01)
(Continued)

(52) U.S. Cl.
CPC ............ *G06F 40/30* (2020.01); *G06F 40/242* (2020.01)

(58) Field of Classification Search
CPC ...... G06F 40/30; G06F 40/242; G06F 9/4881; G06F 9/5072; G06F 9/5038; H04L 67/10;
(Continued)

(56) References Cited

U.S. PATENT DOCUMENTS

| 6,026,413 A | 2/2000 | Challenger et al. |
| 7,996,413 B2 | 8/2011 | Cotichini et al. |

(Continued)

FOREIGN PATENT DOCUMENTS

| CN | 107665252 A | 2/2018 |
| EP | 3428813 A1 | 1/2019 |

(Continued)

OTHER PUBLICATIONS

S. Lalithsena et al., "Automatic Domain Identification for Linked Open Data," 2013 IEEE/WIC/ACM International Joint Conferences on Web Intelligence (WI) and Intelligent Agent Technologies (IAT), Nov. 2013, 8 pages.

(Continued)

*Primary Examiner* — Thuy Dao
(74) *Attorney, Agent, or Firm* — Daniel Yeates; Ryan, Mason & Lewis, LLP

(57) ABSTRACT

An apparatus is disclosed which includes at least one processing device comprising a processor coupled to a memory. The at least one processing device, when executing program code, is configured to: extract one or more entities identified in a plurality of data artifacts based at least in part on one or more datasets, extract one or more entities identified in a plurality of code artifacts based at least in part on the one or more datasets, extract one or more entities identified in a plurality of user interface artifacts based at least in part on the one or more datasets, generate a set of dependency graphs each based at least in part on one or more relationships among the respective extracted one or more entities, and perform one or more of a lexical analysis and a semantic analysis on the set of dependency graphs to identify a data domain of the one or more datasets.

20 Claims, 8 Drawing Sheets

(51) Int. Cl.
  *G06F 9/455* (2018.01)
  *G06F 12/14* (2006.01)
  *G06F 40/242* (2020.01)
  *G06N 20/00* (2019.01)
  *H04L 9/40* (2022.01)

(58) Field of Classification Search
  CPC ............. H04L 63/1425; H04L 63/0236; H04L 63/1416
  See application file for complete search history.

(56) References Cited

U.S. PATENT DOCUMENTS

| | | | |
|---|---|---|---|
| 9,589,037 B2* | 3/2017 | Hill | ........................ G06F 8/71 |
| 12,192,230 B2* | 1/2025 | Glazier | ............... H04L 63/1425 |
| 2006/0136467 A1 | 6/2006 | Avinash et al. | |
| 2022/0350745 A1 | 11/2022 | Xia et al. | |

FOREIGN PATENT DOCUMENTS

| | | |
|---|---|---|
| WO | 2018155816 A1 | 8/2018 |
| WO | 2021217502 A1 | 11/2021 |
| WO | 2004006118 A1 | 11/2022 |

OTHER PUBLICATIONS

A. Abele et al., "Linked Data Profiling: Identifying the Domain of Datasets Based on Data Content and Metadata," WWWW'16 Companion, Apr. 15, 2016, pp. 287-291.

M. Ota et al., "Data-Driven Domain Discovery for Structured Datasets," Proceedings of the VLDB Endowment, Mar. 2020, pp. 953-965.

P. Mell et al., "The NIST Definition of Cloud Computing," Recommendations of the National Institute of Standards and Technology, Special Publication 800-145, Sep. 2011, 7 pages.

International Search Report and Written Opinion of PCT/CN2022/130287, Jan. 18, 2023, 9 pages.

* cited by examiner

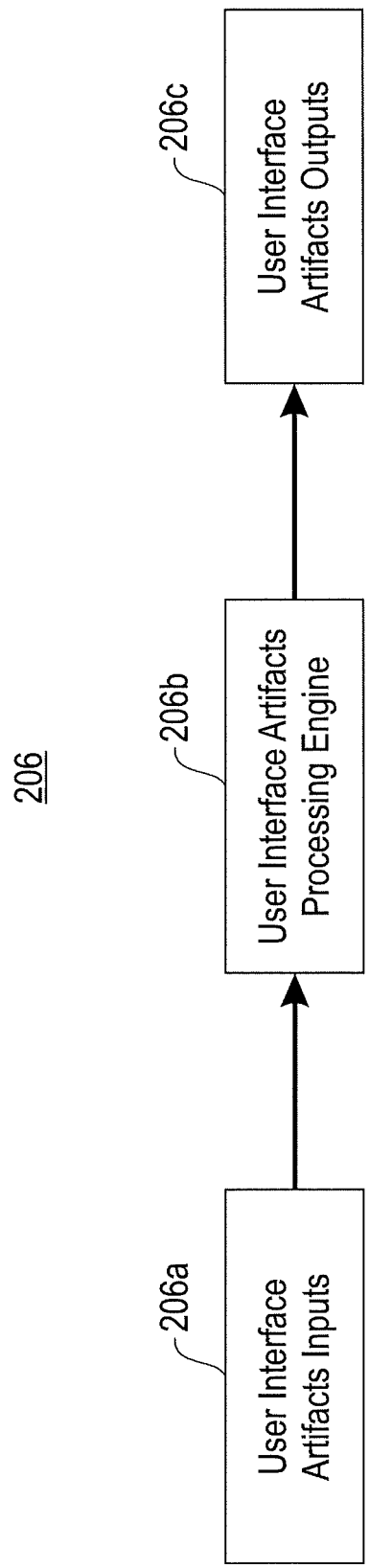

AUTOMATIC DATA DOMAIN IDENTIFICATION

BACKGROUND

Information technology (IT) systems associated with an enterprise are important in today's fast-moving business climate in order to maintain advantages over competitors. Over time, technology has rapidly improved and many of these systems have become outdated and inefficient. As a result, many enterprises are looking for a viable approach to modernize their legacy IT systems.

SUMMARY

Embodiments provide techniques for automatically identifying a domain of one or more datasets.

In one illustrative embodiment, an apparatus comprises at least one processing device comprising a processor coupled to a memory. The at least one processing device, when executing program code, is configured to extract one or more entities identified in a plurality of data artifacts based at least in part on one or more datasets. The at least one processing device is further configured to extract one or more entities identified in a plurality of code artifacts based at least in part on the one or more datasets. The at least one processing device is further configured to extract one or more entities identified in a plurality of user interface artifacts based at least in part on the one or more datasets. The at least one processing device is further configured to generate a set of dependency graphs each based at least in part on one or more relationships among the respective extracted one or more entities. The at least one processing device is further configured to perform one or more of a lexical analysis and a semantic analysis on the set of dependency graphs to identify a data domain of the one or more datasets.

In one illustrative embodiment, a method comprises extracting one or more entities identified in a plurality of data artifacts based at least in part on one or more datasets. The method further comprises extracting one or more entities identified in a plurality of code artifacts based at least in part on the one or more datasets. The method further comprises extracting one or more entities identified in a plurality of user interface artifacts based at least in part on the one or more datasets. The method further comprises generating a set of dependency graphs each based at least in part on one or more relationships among the respective extracted one or more entities. The method further comprises performing one or more of a lexical analysis and a semantic analysis on the set of dependency graphs to identify a data domain of the one or more datasets.

Further illustrative embodiments are provided in the form of a computer program product comprising a non-transitory computer-readable storage medium having embodied therein executable program code that when executed by a processor causes the processor to perform the above steps.

These and other features and advantages of embodiments described herein will become more apparent from the accompanying drawings and the following detailed description.

BRIEF DESCRIPTION OF THE DRAWINGS

FIG. 2D depicts a user interface artifacts processing system of the system of FIG. 2A according to an illustrative embodiment.

DETAILED DESCRIPTION

Figure 1:
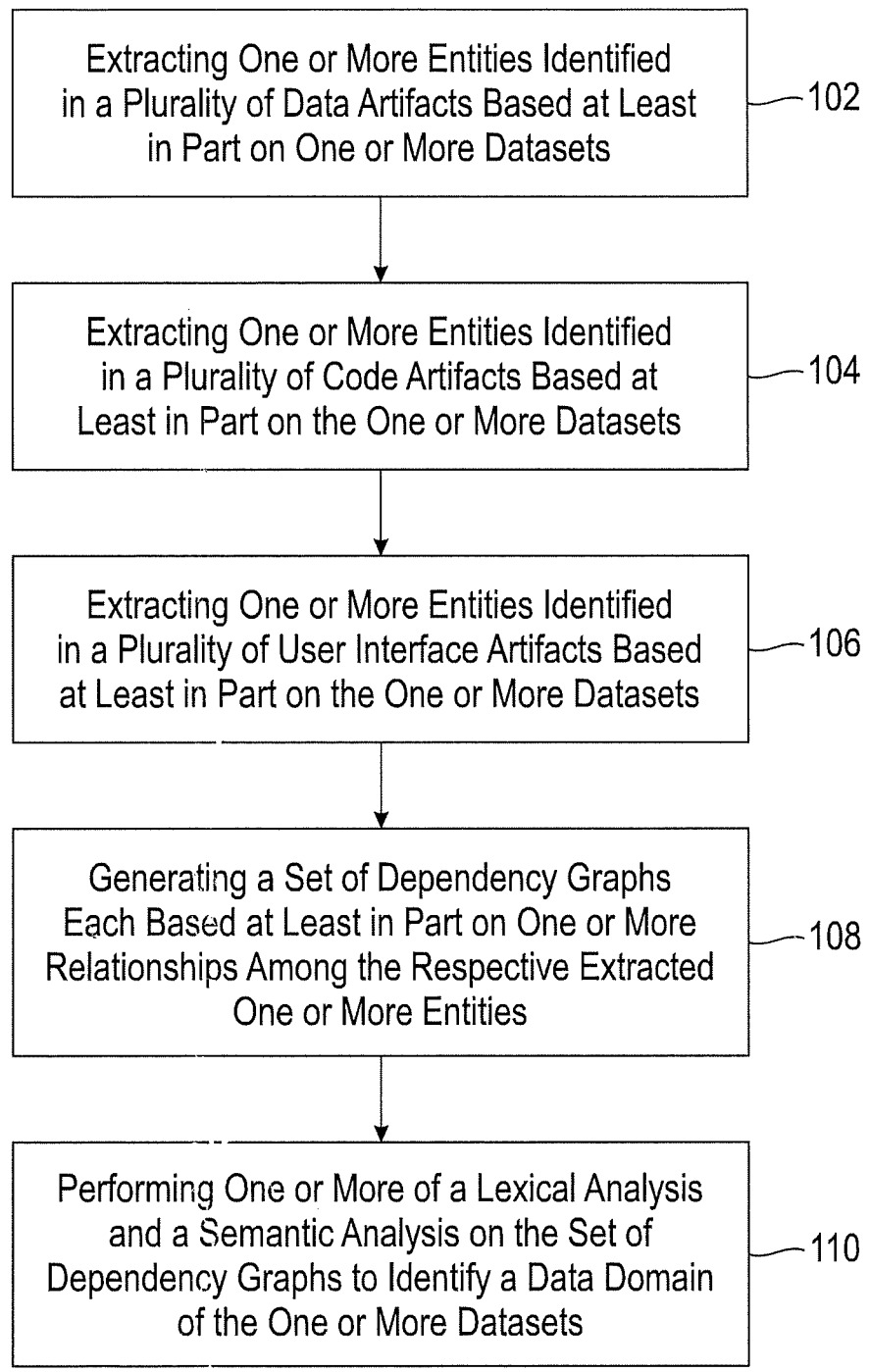
FIG. 1 illustrates a flow diagram for data domain identification according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing systems, by way of example only, processing systems comprising cloud computing and storage systems as well as other types of processing systems comprising various combinations of physical and/or virtual processing resources.

As mentioned above in the background section, many enterprises are looking for a viable approach to modernize their legacy database systems. In modernizing a legacy database system, the modernization of the data of the systems is mostly re-platformed or re-factored. For example, re-platform modernization is migrating a database to a new target. This allows for minimal changes to schema to adapt to the new platform, without changing the structure or the features or functions it provides. Re-factor modernization is a re-architect and re-structuring of existing data architecture leveraging a mix of new and existing data stores. Through this transformation one can include one or more of a revised database type, a database schema, a data model, etc. A simplest form of refactor modernization would be to split up existing databases without changing the schema.

Presently, during data modernization, identifying the domain of data is often a tedious manual task. The data domain plays a key role in identifying related data-sets, associated code and other increment artifacts to be determined while modernizing legacy infrastructures. Data comes in various forms, files, Virtual Storage Access Method (VSAM files) Information Management System (IMS) segments and database software, such as IBM DB2® database software. (DB2 is a trademark of International Business Machines Corporation registered in many jurisdictions worldwide). Given application details such as data artifacts (e.g., table schema, data-sets, etc.), code artifacts (e.g., source code, etc.) and associated interfaces (e.g., user interface screens, etc.), one must identify the logical domain of the "data-sets" in the application. For example, in a given table schema such as cust_tbl with attributes cust_nm, cust_addr etc. and prod_tbl with prod_id, prod_quantity, etc., one would identify the logical domain from the schema automatically as CUSTOMER, PRODUCT, etc. Accordingly, there is a need for automatically identifying the domain of the data in order to speed up modernization efforts.

Illustrative embodiments address the above and other challenges by providing techniques for automatically identifying the domain of the data. In more detail, techniques for automatically identifying the logical domain of data from legacy applications is carried out by employing a combination of user interface (UI) elements (e.g., forms and UI objects), control flow call graphs, data objects (e.g., database Data Definition Language (DDL), and Data Manipulation Language (DML), etc.) from at least data, code and user interface artifacts.

Figure 2A:
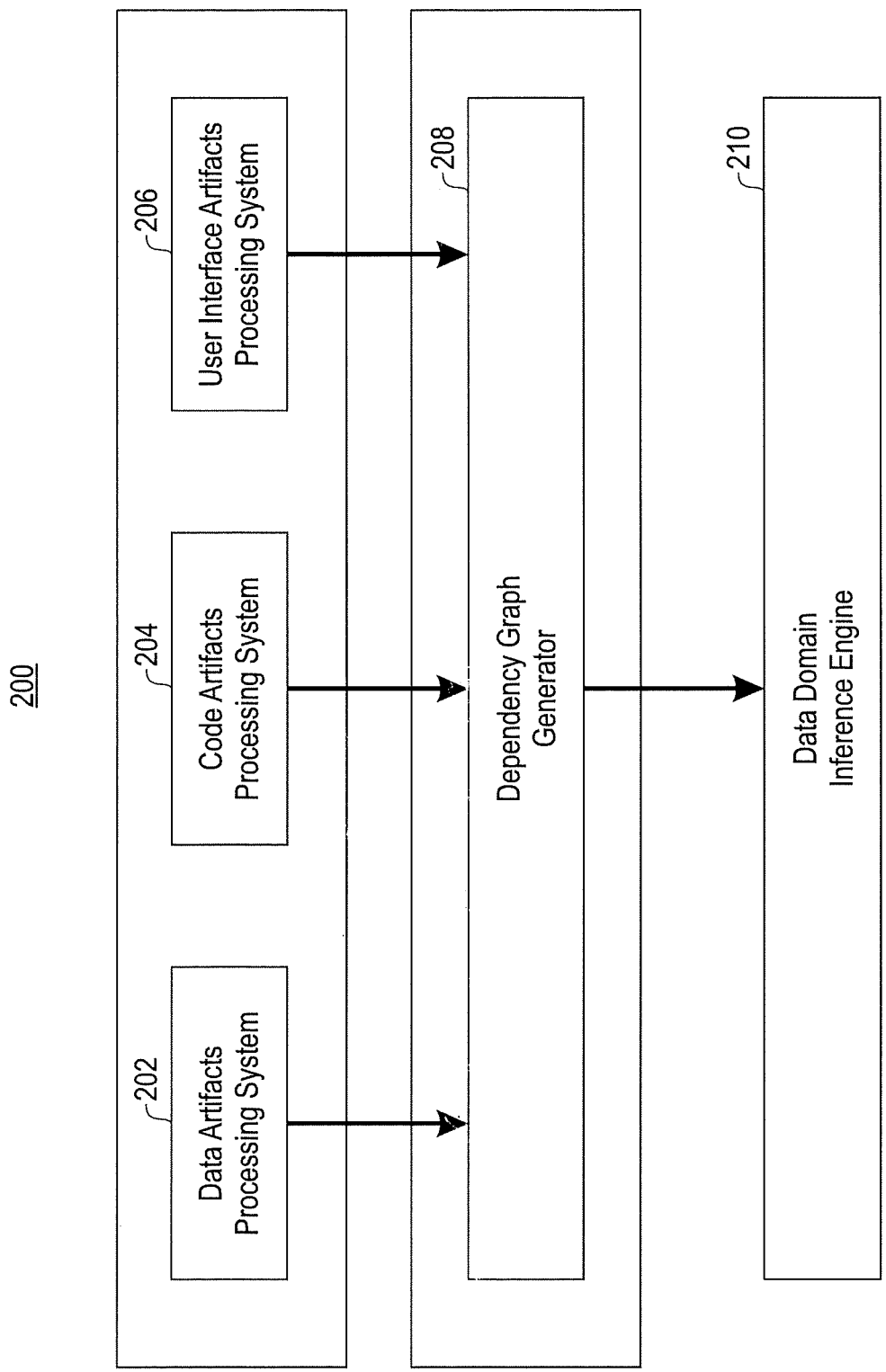
FIG. 2A illustrates a processing system for data domain identification according to an illustrative embodiment.

FIG. 1 illustrates a flow diagram for data domain identification according to an illustrative embodiment. As shown in FIG. 1, step 102 includes extracting one or more entities identified in a plurality of data artifacts of one or more datasets. FIG. 2A depicts a domain processing system 200 including data artifacts processing system 202 according to an illustrative embodiment. As shown in FIG. 2A by lines and/or arrows, the components of the system 200 are operatively connected to each other via, for example, physical connections, such as wired and/or direct electrical contact connections, and/or wireless connections, such as, for example, WiFi, BLUETOOTH, IEEE 802.11, and/or other networks, including but not limited to, a local area network (LAN), wide area network (WAN), cellular network, ad hoc networks (e.g., wireless ad hoc network (WANET)), satellite network or the Internet.

Figure 2B:
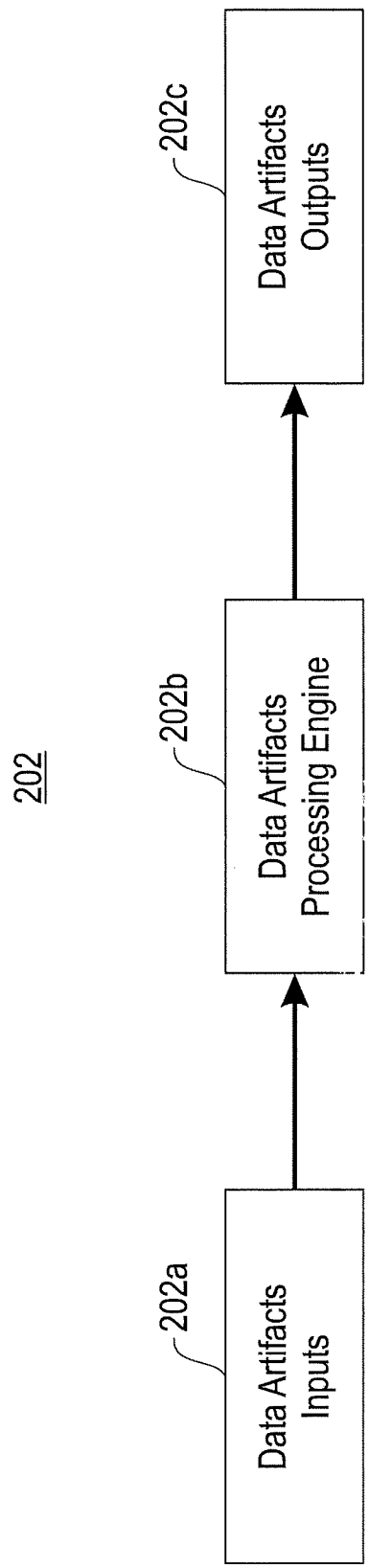
FIG. 2B depicts a data artifacts processing system of the system of FIG. 2A according to an illustrative embodiment.

As shown in FIG. 2B, data artifacts processing system 202 of domain processing system 200 includes data artifacts inputs 202a, data artifacts processing engine 202b and data artifacts outputs 202c. The data artifacts inputs 202a includes data artifacts which are input to the data artifacts processing engine 202b. Data artifacts processing engine 202b processes the data artifacts inputs 202a to generate data artifacts outputs 202c that are representative of entities extracted from the data artifacts inputs 202a. In an illustrative non-limiting embodiment, data artifacts comprise one or more of (a) one or more schemas with their table names and associated column names, (b) index, trigger, and stored procedures associated with the schemas, (c) relationships between the different tables and databases, (d) table data, and (e) documentation, logs, performance and operational profile of data-sets. However, other data artifacts are envisioned herein and the above list is merely exemplary.

According to one or more embodiments, the data artifacts processing engine 202b processes the data artifacts inputted from data artifacts inputs 202a to generate the data artifacts outputs 202c comprising extracted one or more entities from the data artifacts based at least in part on the extracted one or more entities from the data artifacts inputs 202a. In an illustrative embodiment, data artifacts processing engine 202b will identify the data objects and transaction dependencies from the data artifacts. For example, data artifacts processing engine 202b will identify the data objects and transaction dependencies from the data artifacts using one or more of a DDL operation, and a DML operation. DDL operations are database operations that define or alter a database object such as a table, index, or stored query, for example, CREATE, ALTER, DROP, and TRUNCATE operations in Structured Query Language (SQL). DML operations are database operations that manage data within schema objects, for example, INSERT, DELETE, SELECT, or UPDATE operations in SQL.

The data artifacts processing engine 202b then extracts the data flow from the transactions. For example, data artifacts processing engine 202b extracts such artifacts as table names, descriptions, column names, and column description available in one or more database schemas in forming a dataset. The data artifacts processing engine 202b can then extract relationships between the extracted tables of the data set. For example, in an illustrative embodiment, various relationship data may be extracted such as, for example, a primary key ("PK") of the dataset, one or more foreign keys ("FK") of the dataset, and/or one or more data statistics. The relative importance of the extracted information from, for example, the transaction types, are performed so that entities and relationships of the data artifacts are identified. In one embodiment, the relative importance can be carried out by a statistics module configured to count the number of entities and/or relationships defined in the data artifacts in order to determine their relative importance. Following processing the data artifacts inputted from data artifacts inputs 202a to the data artifacts processing engine 202b, the data artifacts outputs 202c are generated comprising extracted entities and relationships from the data artifacts based on the extract entities from the data artifacts inputs 202a.

Figure 2C:
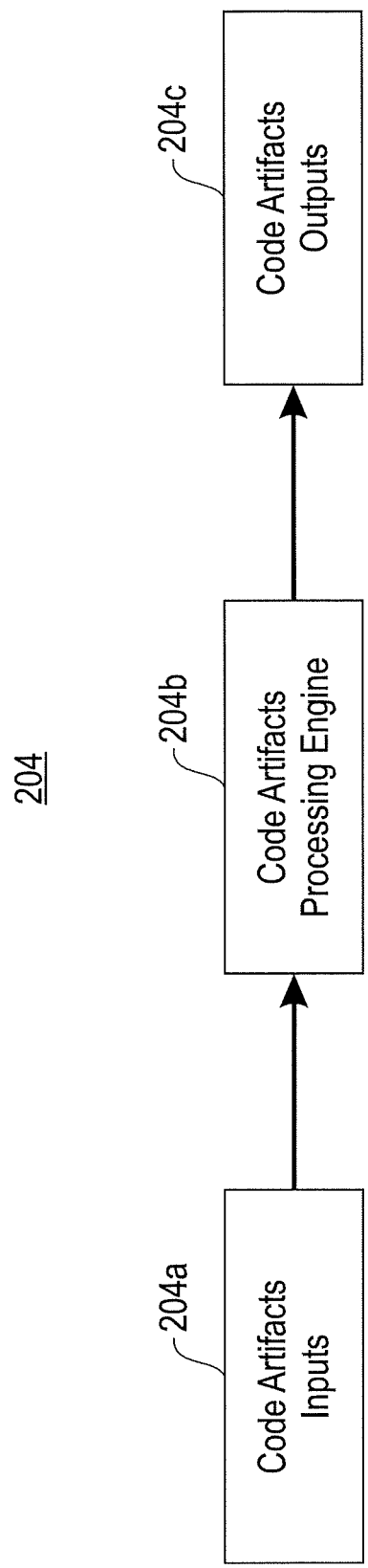
FIG. 2C depicts a code artifacts processing system of the system of FIG. 2A according to an illustrative embodiment.

Step 104 of FIG. 1 includes extracting one or more entities identified in a plurality of code artifacts based at least in part on the one or more datasets. FIG. 2A depicts domain processing system 200 further including code artifacts processing system 204 according to an illustrative embodiment. As shown in FIG. 2C, code artifacts processing system 204 includes code artifacts inputs 204a, code artifacts processing engine 204b and code artifacts outputs 204c. The code artifacts inputs 204a includes code artifacts which are input to the code artifacts processing engine 204b. Code artifacts processing engine 204b processes the code artifacts inputs 204a to generate code artifacts outputs 204c that are representative of entities extracted from the code artifacts inputs 204a. In an illustrative non-limiting embodiment, code artifacts comprise one or more of (a) source code and associated libraries, (b) user interface screens and other user interface modalities (e.g., voice, chatbot, multi-media, etc.), (c) documentation, performance profile, operational M&Ps, and (d) deployment blueprint. However, other code artifacts are envisioned herein and the above list is merely exemplary.

According to one or more embodiments, the code artifacts processing engine 204b processes the code artifacts inputted from code artifacts inputs 204a to generate the code artifacts outputs 204c comprising extracted one or more entities from the code artifacts based at least in part on the extracted one or more entities from the code artifacts inputs 204a. In an illustrative embodiment, code artifacts processing engine 204b will identify the flow from the source code. For example, code artifacts processing engine 204b will identify the flow from the source code using programs, procedures, transactions, variables and copybooks. In addition, code artifacts processing engine 204b will extract the data flow from, for example, procedure calls. The relative importance of the extracted information from, for example, the transaction types, are performed and entities and relationships of the data artifacts are identified. In one embodiment, the relative importance can be carried out by a statistics module configured to count the number of entities and/or relationships defined in the code artifacts in order to determine their relative importance. The transaction types can include, for example, read/write transactions, concurrent transactions, etc. Following processing the code artifacts inputted from code artifacts inputs 204a to the code artifacts processing engine 204b, the code artifacts outputs 204c are generated comprising extracted one or more entities from the code artifacts based at least in part on the extracted one or more entities from the code artifacts inputs 204a. The code artifacts processing engine 204*b* also establishes the relationships between one or more code artifacts (e.g., programs, transactions, procedures, variables and copybooks) to one or more data artifacts (e.g., table elements and schema).

Step 106 of FIG. 1 includes extracting one or more entities identified in a plurality of user interface artifacts based at least in part on the one or more datasets. FIG. 2A depicts domain processing system 200 further including user interface artifacts processing system 206 according to an illustrative embodiment. As shown in FIG. 2D, user interface artifacts processing system 206 includes user interface artifacts inputs 206*a*, user interface artifacts processing engine 206*b* and user interface artifacts outputs 206*c*. The user interface artifacts inputs 206*a* includes user interface artifacts which are input to the user interface artifacts processing engine 206*b*. User interface artifacts processing engine 206*b* processes the user interface artifacts inputs 206*a* to generate user interface artifacts outputs 206*c* that are representative of entities extracted from the user interface artifacts inputs 206*a*. As used herein, the term "user interface artifacts" refers to a smaller part or piece of a user interface which defines how the user interface behaves (e.g., in response to a user's input or interactions) and/or is rendered or otherwise displayed. To put it another way, a user interface is a collection of visual, audio or display elements which are displayed, as well as a collection of actions, step, or processes which are performed (e.g., when in a certain state or when certain conditions have been met) and a user interface artifact is a smaller piece of the user interface which describes some slice of how the user interface behaves or is rendered/displayed. In an illustrative non-limiting embodiment, user interface artifacts comprise one or more of (a) user interface screens with natural language text (e.g., title, text and instructions for user entry), (b) user interface form objects and formatting (e.g., style sheets, font sizes and types), and (c) other user interface modalities (e.g., voice, chatbot, multi-media, etc.). However, other user interface artifacts are envisioned herein and the above list is merely exemplary.

According to one or more embodiments, the user interface artifacts processing engine 206*b* processes the user interface artifacts inputted from user interface artifacts inputs 206*a* to generate the user interface artifacts outputs 206*c* comprising extracted one or more entities from the user interface artifacts based at least in part on the extracted one or more entities from the user interface artifacts inputs 206*a*. In an illustrative embodiment, user interface artifacts processing engine 206*b* will identify the interface elements presented to the user. Representative examples of such user interface elements include, but are not limited to, names, Ids, addresses, product names, product codes, and the like. User interface artifacts processing engine 206*b* then extracts the relative importance of the user interface elements from, for example, font type, size, color, and style sheets to identify entities and relationships between user interface elements and user interface objects. Following processing the user interface artifacts inputted from user interface artifacts inputs 206*a* to the user interface artifacts processing engine 206*b*, the user interface artifacts outputs 206*c* is generated comprising extracted one or more entities from the user interface artifacts based at least in part on the extracted one or more entities from the user interface artifacts inputs 206*a*. The user interface artifacts processing engine 206*b* also establishes the relationships between one or more user interface artifacts and one or more code artifacts (e.g., programs, transactions, procedures, variables and copybooks).

Step 108 of FIG. 1 includes generating a set of dependency graphs each based at least in part on relationships among the respective extracted one or more entities from steps 102, 104 and 106. The relationships among the extracted one or more entities can be determined by such techniques as natural language processing techniques and machine learning techniques. The set of dependency graphs can thereafter be formed showing the extracted relationships. A "set of dependency graphs" as used herein can be considered as including one or more dependency graphs. As shown in FIG. 2A, domain processing system 200 further includes dependency graph generator 208 which receives as structure mapping engine (SME) input the one or more extracted one or more entities from each of data artifacts outputs 202*c*, code artifacts outputs 204*c* and user interface artifacts outputs 206*c*. Dependency graph generator 208 then identifies the relationships between one of data artifacts outputs 202*c*, code artifacts outputs 204*c* and user interface artifacts outputs 206*c* and another of data artifacts outputs 202*c*, code artifacts outputs 204*c* and user interface artifacts outputs 206*c* until a set of dependency graphs are generated. For example, in one illustrative non-limiting embodiment, in determining a dependency with voice user interface artifacts, a dependency graph reflecting the terms and dependencies from tables in the data artifacts is generated.

Step 110 of FIG. 1 includes performing one or more of a lexical analysis and a semantic analysis on the set of dependency graphs from the extracted relationships of step 108 to identify a data domain of one or more datasets. FIG. 2A depicts domain processing system 200 which further includes a data domain inference engine 210 for carrying out one of a lexical analysis or a semantic analysis of the extracted relationship in the set of dependency graphs. When carrying out a lexical analysis, data domain inference engine 210 can divide any text into paragraphs, sentences, and words. The lexical analysis may detect punctuation, such as commas, periods, exclamation points, colon, semicolons, carriage returns, brackets, and/or parenthesis in determining how to divide the text into paragraphs, sentences, and words. When carrying out a semantic analysis, data domain inference engine 210 can analyze the real meaning from the text, may extract relevant and useful information from large bodies of unstructured data, and/or may uncover specific meanings of words used in foreign languages mixed with a local language (e.g., English). The semantic analysis may assign text elements respective logical and grammatical roles. The semantic analysis may analyze context in the surrounding text and the text structure to disambiguate the proper meaning of words that have more than one definition. The semantic analysis may analyze the logical structure of a given phrase, clause, sentence, or paragraph to identify the most relevant elements in the text and identify the topic discussed. The semantic analysis may also understand the relationships between different concepts in the text and use such understanding to understand the subject of the text. For example, a table name can be derived from meaningful column names, through any machine learned code. In addition, a domain name can be derived from a section header, page header, any meaningful header combining these column names. In some embodiments, semantic analysis can employ one or more machine learning algorithms.

The techniques depicted in FIGS. 1-2D can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-2D can be implemented via a computer program product that can include computer useable program code that is stored in a computer readable storage medium in a data processing system, and wherein the computer useable program code was downloaded over a network from a remote data processing system. Also, in an embodiment, the computer program product can include computer useable program code that is stored in a computer readable storage medium in a server data processing system, and wherein the computer useable program code is downloaded over a network to a remote data processing system for use in a computer readable storage medium with the remote system.

An embodiment or elements thereof can be implemented in the form of an apparatus including a memory and at least one processor that is coupled to the memory and configured to perform exemplary method steps.

Figure 3:
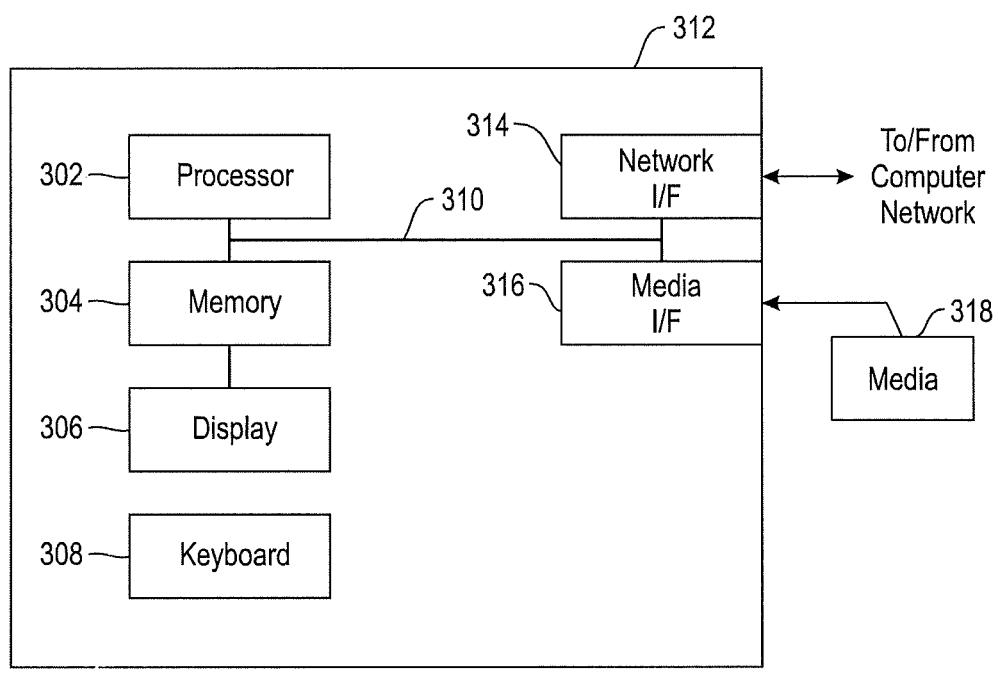
FIG. 3 illustrates a system diagram of an exemplary computer system on which at least one illustrative embodiment can be implemented.

Additionally, an illustrative embodiment can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the illustrative embodiments as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The illustrative embodiments described herein may be a system, a method, and/or a computer program product at any possible technical detail level of integration. The computer program product may include a computer readable storage medium (or media) having computer readable program instructions thereon for causing a processor to carry out aspects of the illustrative embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the illustrative embodiments.

Aspects of the illustrative embodiments are described herein with reference to flowchart illustrations and/or block diagrams of methods, apparatus (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various illustrative embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the provided herein, one of ordinary skill in the related art will be able to contemplate other implementations of the components of the illustrative embodiments.

Additionally, it is understood in advance that implementation of the teachings recited herein are not limited to a particular computing environment. Rather, illustrative embodiments described herein are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
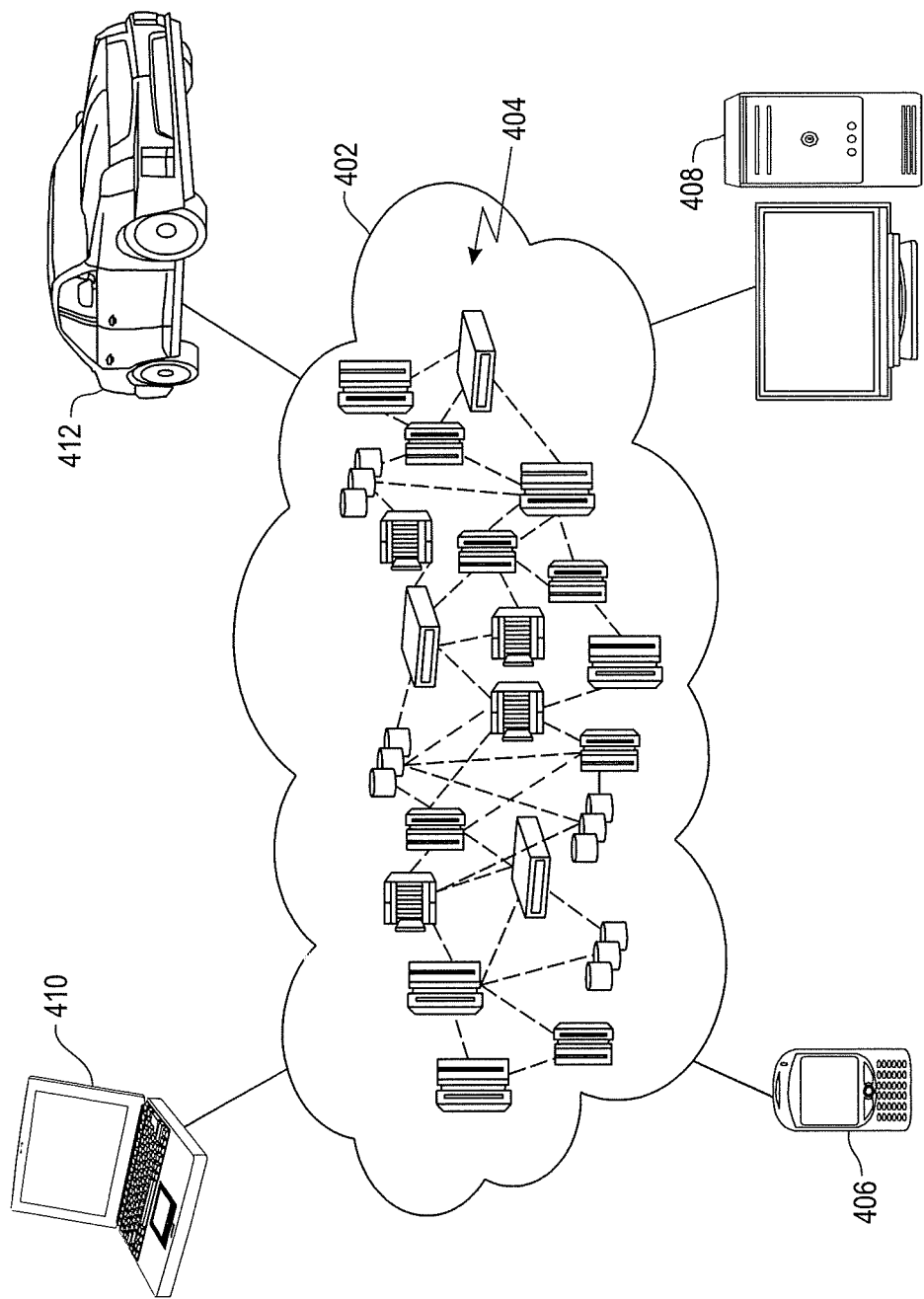
FIG. 4 illustrates a cloud computing environment according to an illustrative embodiment.

Referring now to FIG. 4, illustrative cloud computing environment 402 is depicted. As shown, cloud computing environment 402 includes one or more cloud computing nodes 404 with which local computing devices used by cloud consumers, such as, for example, personal digital assistant (PDA) or cellular telephone 406, desktop computer 408, laptop computer 410, and/or automobile computer system 412 may communicate. Nodes 404 may communicate with one another. They may be grouped (not shown) physically or virtually, in one or more networks, such as Private, Community, Public, or Hybrid clouds as described hereinabove, or a combination thereof. This allows cloud computing environment 402 to offer infrastructure, platforms and/or software as services for which a cloud consumer does not need to maintain resources on a local computing device. It is understood that the types of computing devices 406-412 shown in FIG. 4 are intended to be illustrative only and that computing nodes 404 and cloud computing environment 402 can communicate with any type of computerized device over any type of network and/or network addressable connection (e.g., using a web browser).

Figure 5:
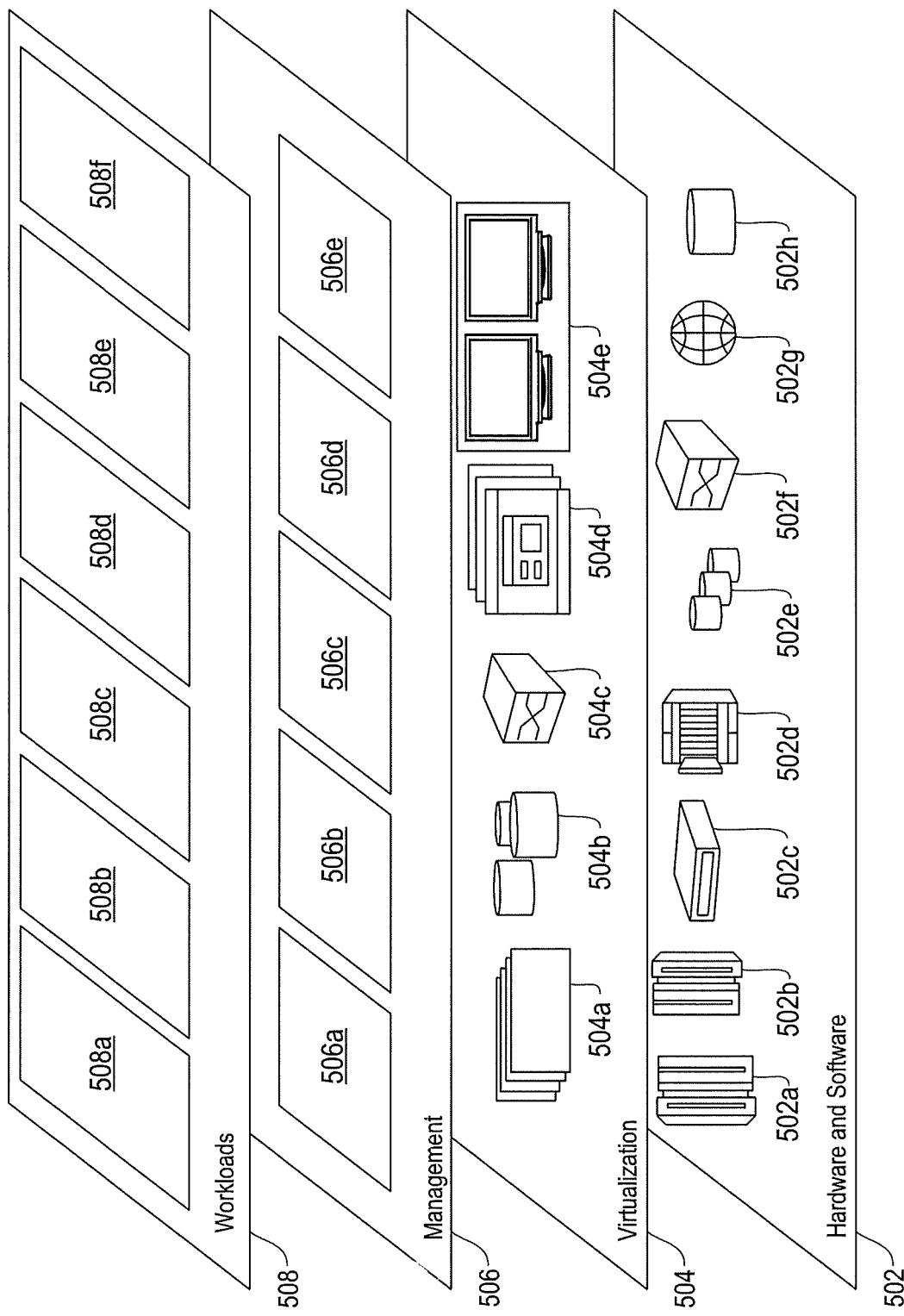
FIG. 5 illustrates abstraction model layers according to an illustrative embodiment.

Referring now to FIG. 5, a set of functional abstraction layers provided by cloud computing environment 402 (FIG. 4) is shown. It should be understood in advance that the components, layers, and functions shown in FIG. 5 are intended to be illustrative only and the embodiments described herein are not limited thereto. As depicted, the following layers and corresponding functions are provided:

Hardware and software layer 502 includes hardware and software components. Examples of hardware components include: mainframes 502*a*; RISC (Reduced Instruction Set Computer) architecture based servers 502*b*; servers 502*c*; blade servers 502*d*; storage devices 502*e*; and networks and networking components 502*f*. In some embodiments, software components include network application server software 502*g* and database software 502*h*.

Virtualization layer 504 provides an abstraction layer from which the following examples of virtual entities may be provided: virtual servers 504*a*; virtual storage 504*b*; virtual networks 504*c*, including virtual private networks; virtual applications and operating systems 504*d* and virtual clients 504*e*. In one example, management layer 506 may provide the functions described below. Resource provisioning 506*a* provides dynamic procurement of computing resources and other resources that are utilized to perform tasks within the cloud computing environment. Metering and Pricing 506*b* provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 506*c* provides access to the cloud computing environment for consumers and system administrators. Service level management 506*d* provides cloud computing resource allocation and management such that required service levels are met. Service Level Agreement (SLA) planning and fulfillment 506e provide pre-arrangement for, and procurement of, cloud computing resources for which a future requirement is anticipated in accordance with an SLA.

Workloads layer 508 provides examples of functionality for which the cloud computing environment may be utilized. Examples of workloads and functions which may be provided from this layer include: mapping and navigation 508a; software development and lifecycle management 508b; virtual classroom education delivery 508c; data analytics processing 508d; transaction processing 508e; and data domain identification 508f, in accordance with the one or more embodiments.

The terminology used herein is for the purpose of describing particular embodiments only and is not intended to be limiting of the illustrative embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one illustrative embodiment may provide a beneficial effect such as, for example, automatically identifying the domain of the data in order to speed up modernization efforts.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   at least one processing device comprising a processor coupled to a memory, the at least one processing device, when executing program code, is configured to:
   extract one or more entities identified in a plurality of data artifacts based at least in part on one or more datasets;
   extract one or more entities identified in a plurality of code artifacts based at least in part on the one or more datasets;
   extract one or more entities identified in a plurality of user interface artifacts based at least in part on the one or more datasets;
   generate a set of dependency graphs each based at least in part on one or more relationships among the respective extracted one or more entities; and
   perform one or more of a lexical analysis and a semantic analysis on the set of dependency graphs to identify a data domain of the one or more datasets.

2. The apparatus of claim 1, wherein the plurality of data artifacts comprises one or more of (a) one or more schemas with their table names and associated column names, (b) index, trigger, and stored procedures associated with the schemas, (c) relationships between the different tables and databases, (d) table data, and (e) documentation, logs, performance and operational profile of datasets.

3. The apparatus of claim 1, wherein the plurality of code artifacts comprises source code and associated libraries.

4. The apparatus of claim 1, wherein the plurality of user interface artifacts comprises one or more of (a) user interface screens with natural language text, (b) user interface form objects and formatting, and (c) user interface modalities.

5. The apparatus of claim 1, wherein generating a set of dependency graphs each based at least in part on one or more relationships among the respective extracted one or more entities comprises generating a first dependency graph of the set of dependency graphs based at least in part on one or more relationships between the extracted one or more entities of the data artifacts and the extracted one or more entities of the code artifacts.

6. The apparatus of claim 5, wherein generating a set of dependency graphs each based at least in part on one or more relationships among the respective extracted one or more entities further comprises generating a second dependency graph of the set of dependency graphs based at least in part on one or more relationships between the extracted one or more entities of the data artifacts and the extracted one or more entities of the user interface artifacts.

7. The apparatus of claim 6, wherein generating a set of dependency graphs each based at least in part on one or more relationships among the respective extracted one or more entities further comprises generating a third dependency graph of the set of dependency graphs based at least in part on one or more relationships between the extracted one or more entities of the code artifacts and the extracted one or more entities of the user interface artifacts.

8. The apparatus of claim 1, wherein the at least one processing device, when executing program code, is further configured to:
   retrieve the data artifacts from at least one of a database and a file system; and
   apply one of a data definition language operation and a data manipulation language operation to identify the one or more entities in each data artifact and to determine one or more relationships between the one or more entities.

9. A computer-implemented method, comprising:
   extracting one or more entities identified in a plurality of data artifacts based at least in part on one or more datasets;
   extracting one or more entities identified in a plurality of code artifacts based at least in part on the one or more datasets;
   extracting one or more entities identified in a plurality of user interface artifacts based at least in part on the one or more datasets;
   generating a set of dependency graphs each based at least in part on one or more relationships among the respective extracted one or more entities; and
   performing one or more of a lexical analysis and a semantic analysis on the set of dependency graphs to identify a data domain of the one or more datasets;
   wherein the method is carried out by at least one computing device.

10. The computer-implemented method of claim 9, wherein the plurality of data artifacts comprises one or more of (a) one or more schemas with their table names and associated column names, (b) index, trigger, and stored procedures associated with the schemas, (c) relationships between the different tables and databases, (d) table data, and (e) documentation, logs, performance and operational profile of datasets.

11. The computer-implemented method of claim 9, wherein the plurality of code artifacts comprises source code and associated libraries.

12. The computer-implemented method of claim 9, wherein the plurality of user interface artifacts comprises one or more of (a) user interface screens with natural language text, (b) user interface form objects and formatting, and (c) user interface modalities.

13. The computer-implemented method of claim 9, wherein generating a set of dependency graphs each based at least in part on one or more relationships among the respective extracted one or more entities comprises generating a first dependency graph of the set of dependency graphs based at least in part on one or more relationships between the extracted one or more entities of the data artifacts and the extracted one or more entities of the code artifacts.

14. The computer-implemented method of claim 13, wherein generating a set of dependency graphs each based at least in part on one or more relationships among the respective extracted one or more entities further comprises generating a second dependency graph of the set of dependency graphs based at least in part on one or more relationships between the extracted one or more entities of the data artifacts and the extracted one or more entities of the user interface artifacts.

15. The computer-implemented method of claim 14, wherein generating a set of dependency graphs each based at least in part on one or more relationships among the respective extracted one or more entities further comprises generating a third dependency graph of the set of dependency graphs based at least in part on one or more relationships between the extracted one or more entities of the code artifacts and the extracted one or more entities of the user interface artifacts.

16. The computer-implemented method of claim 9, further comprising:
retrieving the data artifacts from at least one of a database and a file system; and
applying one of a data definition language operation and a data manipulation language operation to identify the one or more entities in each data artifact and determine one or more relationships between the one or more entities.

17. A computer program product comprising a non-transitory computer readable storage medium having program instructions embodied therewith, the program instructions executable by a computing device to cause the computing device to:
extract one or more entities identified in a plurality of data artifacts based at least in part on one or more datasets;
extract one or more entities identified in a plurality of code artifacts based at least in part on the one or more datasets;
extract one or more entities identified in a plurality of user interface artifacts based at least in part on the one or more datasets;
generate a set of dependency graphs each based at least in part on one or more relationships among the respective extracted one or more entities; and
perform one or more of a lexical analysis and a semantic analysis on the set of dependency graphs to identify a data domain of the one or more datasets.

18. The computer program product of claim 17, wherein generating a set of dependency graphs each based at least in part on one or more relationships among the respective extracted one or more entities comprises generating a first dependency graph of the set of dependency graphs based at least in part on one or more relationships between the extracted one or more entities of the data artifacts and the extracted one or more entities of the code artifacts.

19. The computer program product of claim 18, wherein generating a set of dependency graphs each based at least in part on one or more relationships among the respective extracted one or more entities further comprises generating a second dependency graph of the set of dependency graphs based at least in part on one or more relationships between the extracted one or more entities of the data artifacts and the extracted one or more entities of the user interface artifacts.

20. The computer program product of claim 19, wherein generating a set of dependency graphs each based at least in part on one or more relationships among the respective extracted one or more entities further comprises generating a third dependency graph of the set of dependency graphs based at least in part on one or more relationships between the extracted one or more entities of the code artifacts and the extracted one or more entities of the user interface artifacts.

* * * * *